United States Patent [19]
Sneddon et al.

[11] Patent Number: 6,025,454
[45] Date of Patent: Feb. 15, 2000

[54] DIRECT THERMAL SYNTHESIS AND CERAMIC APPLICATIONS OF POLY (BORAZYLENES) AND BORAZINE/POLYHEDRAL BORANE OLIGOMERS

[75] Inventors: Larry G. Sneddon, Havertown, Pa.; Jeffrey Scott Beck, Princeton; Paul Joseph Fazen, Wenonah, both of N.J.

[73] Assignee: The Trustees of the University of Pennsylvania, Philadelphia, Pa.

[21] Appl. No.: 08/760,708

[22] Filed: Dec. 5, 1996

Related U.S. Application Data

[60] Continuation of application No. 08/587,385, Jan. 17, 1996, which is a division of application No. 08/143,524, Oct. 26, 1993, Pat. No. 5,502,142, which is a continuation of application No. 07/821,344, Jan. 13, 1992, which is a continuation of application No. 07/491,293, Mar. 9, 1990.

[51] Int. Cl.$^7$ .................................................. C08G 79/08
[52] U.S. Cl. ............................ 528/7; 528/394; 528/423; 423/280; 423/283; 423/285; 264/176.1; 264/211.12; 264/291; 264/292
[58] Field of Search ................................. 528/7, 394, 423; 423/280, 283, 285; 264/176.1, 211.12, 291, 292

[56] References Cited

U.S. PATENT DOCUMENTS

| | | | |
|---|---|---|---|
| 3,052,641 | 9/1962 | McCloskey | 528/7 |
| 3,166,520 | 1/1965 | English et al. | 528/7 |
| 4,801,439 | 1/1989 | Blum et al. | 423/284 |

FOREIGN PATENT DOCUMENTS 670 105   12/1989   Switzerland.

OTHER PUBLICATIONS

CAS Registry File 39526–51–7.
Liepins and Sakaoku, "Submicron Polymer Powder in Electrodeless Radio Frequency–Induced Plasma–Initiated Polymerization," *J. of Applied Polymer Science* 16:2633–2645 (1972).
Pozela and Radvilavicius, "Energy Levels and Wave Functions of Polyborazoles, " *I Liet. Fiz. Rinkinys* 15:559–564 (1975).
Kouvetakis, et al., "Composition and structure of boron nitride films deposited by chemical vapor deposition from borazine," *J. Vac. Sci. Technol.* A 8 (6) : 3929–3933 Nov./Dec. (1990).
Nguyen, et al., "Plasma–Assisted Chemical Vapor Deposition and Characterization of Boron Nitride Films," *J. Electrochem Soc.*, 141 (6) : 1633–1638 (1994).
Fazen et al., "Thermally Induced Borazine Dehydropolymerization Reactions. Synthesis and Ceramic Conversion Reactions of a New High–Yield Polymeric Precursor to Boron Nitride," *Chemistry of Materials*: 2 (1990).
Lynch, A.T., Sneddon, L.G., Abstracts of Papers of American Chemical Society Meeting, Los Angeles, CA, 1988, paper No. 296.
Laubengayer, A.W., Moews, P.C., Jr., Porter, R.F., *J. Am. Chem. Soc.*, 83: 1337–1342 (1961).
Lynch, A.T. Ph.D. Thesis, University of Pennsylvania, 1989, entitled "Transition Metal Catalyzed Reactions of Borazine: New Synthetic Routes to Boron Nitride Ceramics".
Wagner, R.I., Bradford, J.L., *Inorg. Chem.*, 1: 99–106 (1962).
Brotherton, R. J., McCloskey, A.L., *Chem Abstr.*, 60: 547 (1964).
Gerrard, W., Hudson, H.R, Mooney, E.F., *J. Chem. Soc.*, 113–119 (1962).
Harris, J.J., *J. Org. Chem.*, 26: 2155–2156 (1961).
Mamantov, G., Margrave, J.L., *J. Inorg. Nucl. Chem.*, 20: 348–351 (1961).
Neiss, M.A., Porter, R.F., *J. Am. Chem. Soc.*, 94: 1438–1443 (1972).
Schaeffer, R., Steindler, M., Hohnstedt, L., Smith, H.R., Jr., Eddy, L.B., Schlesinger, H.I., *J. Chem Soc.*, 76: 3303–3306 (1954).
Hawarth, D.T., Hohnstedy, L.F., *J. Chem. Soc.*, 82: 3860–3862 (1960).

*Primary Examiner*—Samuel A. Acquah
*Attorney, Agent, or Firm*—Woodcock Washburn Kurtz Mackiewicz & Norris, LLP

[57] ABSTRACT

Direct thermal syntheses in the absence of catalyst, of poly(borazylenes) and of oligomers of borazine with polyhedral boranes, carboranes or heteroboranes are disclosed. The products of these syntheses are precursors to BN or other boron-containing ceramics.

11 Claims, No Drawings

DIRECT THERMAL SYNTHESIS AND CERAMIC APPLICATIONS OF POLY (BORAZYLENES) AND BORAZINE/ POLYHEDRAL BORANE OLIGOMERS

This is a continuation of application Ser. No. 08/587,385 filed Jan. 17, 1996 which is a Rule 1.60 divisional of U.S. Ser. No. 08/143,524 filed Oct. 26, 1993, now U.S. Pat. No. 5,502,142 which is a Rule 1.62 Continuation of U.S. Ser. No. 07/821,344 filed Jan. 13, 1992 which is a Continuation of U.S. Ser. No. 07/491,293 filed Mar. 9, 1990.

BACKGROUND OF THE INVENTION

This invention relates to highly soluble poly (borazylenes), to a direct thermal process, not requiring a catalyst, for preparing poly(borazylenes), and to the use of such poly(borazylenes) as processable precursors for boron nitride. This invention further relates to borazine/polyhedral borane oligomers which can also be made by a direct thermal process without a catalyst.

Interest in the development of ceramic/ceramic composite materials stems from a desire to improve structural integrity over that of a single ceramic component. For example, ceramic fiber reinforced ceramics are known to exhibit increased strength and toughness due to a lessening of crack propagation. Pipes, B. R., McCullough, R. L., Chou, T. W., *Scientific American*, 1986, 193–203; Bracke, P., Schurmans, H., Vehoest, J., "Inorganic Fibers and composite Materials", EPO Applied Technology Series Volume 3, Pergamon, New York., 1984. A suitable ceramic fiber coating can enhance the strength of a ceramic fiber/ceramic composite by decreasing the interfacial shear strength between the fiber and matrix and thus increase the potential for fiber pullout (toughness). Another benefit of fiber coatings is that they may serve as a diffusion barrier between fibers and matrix materials and, thus, inhibit chemical reactions between these materials at high temperatures. Boron nitride (BN) is a non-oxide ceramic which because of its excellent strength and chemical resistance is an attractive prospect as a ceramic coating for fibers in ceramic fiber/ceramic composites.

Previous methods for the formation of coatings or thin films of BN have generally relied on the use of vapor deposition (CVD) techniques, employing mixtures of $NH_3$ and volatile borane species such as $BCl_3$, $B_2H_6$ and $B_3N_3H_6$. Gmelin Handbuch der Anorganishen Chemie, Boron Compounds, 1980, Third Supplement, Vol. 3, Sec 4 and references therein, and 1988, 3rd Supplement, Volume 3. For example, conventional CVD techniques have been used for the preparation of thin films of BN from a $BCl_3$—$NH_3$—$H_2$ mixture at 1000–1400° C., while plasma assisted CVD of a $B_2H_6$—$NH_3$—$H_2$ mixture results in a deposition of a thin layer of BN in the temperature range of 400–700° C. Lowden, R. A., Besmann, T. M., Stinton, D. P., Ceram. Bull. 1988, 67, 350–355. Although the CVD technique offers an effective pathway for depositing a uniform layer of a ceramic on a variety of substrates, these procedures are often time consuming and costly. An alternative method for generating BN coatings could employ a coatable, non-volatile chemical precursor which could be thermally decomposed to BN on a desired substrate. Indeed, several boron based polymer systems displaying this set of properties have been developed as potential precursors to BN coatings. Paine, R. T., Narula, C. K., Chem. Rev. 1990, 90, 73–92 and references therein; Narula, C. K., Schaeffer, R., Paine, R. T., *J. Am. Cer. Soc.* 1987, 109, 5556–5557; Narula, C. K., Paine, R. T., Schaeffer, R., *Polymer Prep. (Am. Chem. Soc. Div. Polym. Chem.)* 1987, 28, 454; Narula, C. K., Paine, R. T., Schaeffer, R. in Better Ceramics Through Chemistry II, Brinker, C. J., Clark, D. E., Ulrich, D. R. Eds, MRS Symposium Proceedings 73, Materials Research Society:Pittsburgh Pa., 1986, 363–388; Narula, C. K., Paine, R. T., Schaeffer, R., in Inorganic and organometallic Polymers, Zeldin, M., Wynne, K. J., Allcock, H. S. Eds., ACS Symposium Series 360, American Chemical Society: Washington, D.C. 1988, 378–384; Paciorek, K. J. L., Harris, D. H., Krone-Schmidt, W., Kratzer, R. H., Technical Report No. 4, Ultrasystems Defense and Space Inc., Irvine, Calif. 1978; Paciorek, K. J. L., Krone-Schmidt, W., Harris, D. H., Kratzer, R. H., Wynne,. K. J. in Inorganic and Organometallic Polymers, Zeldin, M., Wynne, K. S., Allcock, H. S., Eds., ACS Symposium Series 360, American Chemical Society: Washington, D.C. 1988, 27, 3271; Rees, W. S., Seyferth, D., presented at the 194th National Meeting of the American Chemical Society, New Orleans, La., September 1987, Paper INOR 446; Rees, W. S., Jr., Seyferth, D., *J. Am. Ceram. Soc.*, 1988, 71, C194–C196; Mirabelli, M. G. L., Sneddon, L. G., *Inorg. Chem.* 1988, 27, 3721; Mirabelli, M. G. L., Lynch, A. T., Sneddon, L. G., *Solid State Ionics*, 1989, 32/33, 655–660; Lynch, A. T., Sneddon, L. G., *J. Am. Chem. Soc.*, 1989, 111, 6201–6209.

Poly(borazylenes), polymers comprising linked borazine rings analogous to organic poly(phenylenes), would be ideal precursors for BN if they could be prepared in high yield and had high enough solubility. Small dehydrodimers and oligomers of alkylated borazine have previously been prepared, primarily either by metathesis or coupling reactions; however, owing to its greater reactivity these procedures are unsuitable for the generation of analogous species based on the parent $B_3N_3H_6$ compound. Wagner, R. I., Bradford, J. L., *Inorg. Chem.* 1962, 1, 99–106; Brotherton, R. J., McCloskey, A. L., U.S. Pat. No. 3,101,369, 1963, *Chem. Abstr.* 1964, 60, 547; Gutman, V., Meller, V., Schlegel, R., *Monatsh. Chem.* 1964, 95, 314–318; Gerrard, W., Hudson, H. R., Mooney, E. F., *J. Chem Soc.* 1962, 113–119; Harris, J. J., *J. Org. Chem.* 1961, 26, 2155–2156. The N—B coupled dimer 1:2'-$[B_3N_3H_5]_2$ has been obtained in low yields from the decomposition of liquid borazine at room temperature over several months (Manatov, G., Margrave, J. L., *J. Inorg. Nucl. Chem.* 1961, 20, 348–351) and from the gas phase photolytic (Neiss, M. A., Porter, R. F., *J. Am. Chem. Soc.* 1972, 94, 1438–1443) or pyrolytic (Laubengayer, A. W., Moews, P. C., Jr., Porter, R. F., *J. Am. Chem. Soc.* 1961, 83, 1337–1342) reactions of borazine. The latter two studies also reported the formation of insoluble solids that were proposed to have fused borazine polycyclic structures. Several studies of the stability of liquid borazine have also reported the formation of white low volatile solids, but these materials were not identified. Manatov, G., et al., Op cit., Schaeffer, R., Steindler, M., Hohnstedt, L., Smith, H. R., Jr., Eddy, L. B., Schlesinger, H. I., *J. Am. Chem. Soc.* 1954, 76, 3303–3306; Haworth, D. T., Hohnstedt, L. F., *J. Am. Chem. Soc.* 1960, 82, 3860–3862.

The preparation of certain polyborazine BN-precursors, in which borazine rings are linked by a bridging nitrogen atom, are disclosed in U.S. Pat. No. 4,801,439 (Blum et al.). Blum et al. disclose that compounds containing at least one Group IIIA metal-Group VA nonmetal bond can be prepared by reacting a first reactant having at least one Z—H bond where Z represents a Group VA nonmetal with a second reactant that has at least one M—H bond where M is a Group IIIA metal in the presence of a metal catalyst. The metal catalysts disclosed by Blum et al. for use in their method include: homogeneous catalysts such as $H_4Ru_4(CO)_{12}$, $Ru_3(CO)_{12}$, $Fe_3(CO)_{12}$, $Rh_6(CO)_{16}$, $CO_2(CO)_8$, $(Ph_3P)_2Rh(CO)H$, $H_2PtCl_6$, nickel cyclooctadiene, $Os_3(CO)_{12}$, $Ir_4(CO)_{12}$, $PdCl_2$, $(PhCN)_2PdCl_2$, $(Ph_3P)_2Ir(CO)H$, $Pd(OAc)_2$, $Cp_2TiCl_2$, $(Ph_3P)_3RhCl$, $H_2Os_3(CO)_{10}$, $Pd(Ph_3P)_4$, $Fe_3(CO)_{12}$/$Ru_3(CO)_{12}$, complexes of metal hydrides, and heterogeneous catalysts such as alkaline metals (e.g., Na, K), Pt/C, Pt/BaSO$_4$, Cr, Pd/C, Co/C, Pt black, Co black, Pd black, Ir/Al$_2$O$_3$, Pt/SiO$_2$, Rh/TiO$_2$, Rh/La$_2$O$_3$, Pd/Ag alloy, LaNi$_5$, PtO$_2$, transition metal salts, transition metal hydrides or other transition metal oxides. It is disclosed that either the first reactant or the second reactant, or both, may be borazine. Comparative examples presented in the patent show that preparations carried out in the absence of metal catalyst either did not produce the desired product or produced no product at all. No examples are given of the preparation of a poly(borazylene) polymer.

In Lynch, A. T., Sneddon, L. G., Abstracts of Papers of American Chemical Society Meeting, Los Angeles, Calif., 1988, paper No. 296, the polymerization of borazine in the presence of CpTiMe$_2$ catalyst was reported. The resulting poly(borazylene), after recrystallization, cannot be totally redissolved in organic solvents such as THF or glyme. Further, upon standing for extended periods of time, e.g., at least about one week, the poly(borazylene) prepared using metal catalyst becomes totally insoluble in solvents such as ethers and glyme. Since a processable (i.e., soluble) poly(borazylene) is desired for use as a BN ceramic precursor, the material prepared according to the Lynch et al. disclosure has obvious disadvantages.

Transition metal promoted reactions producing coupled products of borazine and polyhedral boranes have been disclosed. A. T. Lynch, Ph.D. Thesis, University of Pennsylvania, 1989. However, there have been no reports of a simple thermolytic route to these species.

Swiss Patent 670 105, published Dec. 5, 1989, discloses a photolytic method for making dimers of borazine which can be used to make BN coatings. These dimeric mixtures are composed of diborazine and borazanaphthalene or mixtures of the two. The patent suggests that reaction times can be shortened by using transition metal catalysts.

SUMMARY OF THE INVENTION

It has now surprisingly been found that highly soluble poly(borazylenes) may be prepared by a thermal polymerization process in the absence of any catalyst. The polymerization of the compounds in the absence of catalyst is surprising as the common view, as expressed in the Blum patent, U.S. Pat. No. 4,801,439, was that metal catalysts were necessary for any polymerization reaction to borazine to occur. In addition, oligomers of borazine with polyhedral boranes, carboranes or heteroboranes can also surprisingly be prepared by a thermal process in the absence of catalyst.

The poly(borazylenes) prepared according to this method appear to have chain-branched structures and therefore have distinct advantages over those prepared in the presence of metal catalyst in that they exhibit greater solubility in organic solvents. Tests indicate that the poly(borazylenes) prepared in the absence of metal catalyst, and thus containing no measureable traces of such catalyst, are, after recrystallization (e.g., in organic solvents such as THF or glyme), completely soluble in organic solvents and retain their solubility for extended periods of time.

This invention therefore relates to a novel method for preparing poly(borazylenes) or oligomers of boraznes with polyhedral boranes, carboranes or heteroboranes comprising heating one or more borazines or a mixture of borazine and polyhedral boranes, carboranes, or heteroboranes in the absence of any catalyst. This invention further relates to the compositions so prepared, namely, to the poly(borazylenes) which have molecular weights of at least about 500 or the borazine/polyhedral borane, carborane or heteroborane oligomers which are free of measureable traces of metal catalyst and which are useful as ceramic precursors. Still further, this invention relates to articles such as ceramic films, fibers, bodies and ceramic coated substrates which are made using the such ceramic precursors.

DETAILED DESCRIPTION OF THE INVENTION

The term "borazines" as used to define the starting materials utilized to prepare the poly(borazylenes) of this invention includes the compound borazine as well as any optionally mono-, di- or tri-B-alkylated borazine. The borazines useful in this invention have at least one B—H or N—H bond. Although the preferred starting material is unsubstituted borazine, excellent results have also been obtained utilizing B-ethylborazine. The polyhedral boranes, carboranes or heteroboranes useful in this invention are well known in the art, all have at least one B—H bond, and include such compounds as pentaborane(9), decaborane(14), $C_2B_{10}H_{12}$, $C_2B_8H_{10}$, $SB_9H_{11}$ and $S_2B_7H_9$.

Since the poly(borazylenes) and the oligomers are prepared in the absence of catalyst, they are free of measureable traces of catalysts, especially of the metal catalysts heretofore thought necessary for such reactions. Metal catalysts used in prior art processes, which are absent from the products of this invention, are, for example, as described in U.S. Pat. No. 4,801.439 to Blum et al. Generally, these catalysts are those in which a transition metal having eight d electrons is present, such as Rh, Pd and Ir. Other metal catalysts are based on Ti such as the catalysts described by Lynch et al., Abstracts of Papers, supra.

The poly(borazylenes) of this invention are conveniently prepared by heating the appropriate borazine starting material to a polymerizing temperature in the absence of any catalyst. The appropriate temperature will depend upon the starting compound but will generally be at least about 65° C. Higher temperatures, and longer reaction times, are needed for alkylated borazines. For example, a temperature of about 110° C. is preferred for polymerizing B-ethylborazine. The heating step is preferably performed in vacuo, although it could also be performed under an inert gas. Since the starting materials are liquids, no solvents are required, but any nonreactive organic solvent could be used if desired.

To prepare B-alkylated borazine starting borazine and an appropriate olefin may be contacted in the presence of a catalytic amount of a transition metal catalyst. Approximately stoichiometric quantities of the borazine and the olefin are generally used, although a slight excess of either reactant may be preferred. The transition metal catalysts useful in preparing the B-alkylated borazines are compounds well known in the art. The preferred catalysts are those in which the transition metal is one having eight d electrons, and the more preferred catalysts are those in which the transition metal is selected from Rh, Pd and Ir. Examples of transition metal catalysts are those which contain dissociable basic ligands, such as carbon monoxide or phosphines, e.g., $RhH(CO)(PPh_3)_3$, $Ir(CO)Cl[P(C_6H_5)_3]_2$, and $(Me_2C_2)Co_2(CO)_6$. Another class of transition metal catalysts which should be useful are those developed by P. M. Matilis, *Accts. of Chem. Res.* 11, 301–307 (1978), the disclosure of which is hereby incorporated by reference. These catalysts do not contain basic ligands but are based on pentamethylcyclopentadienyl-rhodium and -iridium.

The poly(borazylenes) of this invention have molecular weights of at least about 500 and are highly soluble. The term "highly soluble" as used in this application is intended to encompass those compounds which are soluble (i.e., greater than 1.0 wt. %, but generally at least about 50 wt. %) in common polar solvents such as tetrahydrofuran and glyme. Although not intending to be bound by such theory, it is believed that the poly(borazylenes) prepared according to this invention are more highly chain-branched than those prepared via catalytic methods and that their high solubility is a result of such chain-branching. The advantages of a soluble ceramic precursor are clear. By virtue of virtue of the processability of the precursor, the final ceramic material may be used in a variety of applications, such as thin films, fibers and coatings, not practically available using non-processable precursors.

The poly(borazylenes) prepared according to this invention appear to have a complex structure, having linear and branched chain segments, related to those of the organic poly(phenylenes), in which the borazine rings are joined primarily by B—N linkages. The polymer is isolated as a white powder that is highly soluble in polar solvents, and that according to SEC/LALLS analysis has $M_w$ ranging from 2,100 g/mol to 7,600 g/mol and $M_n$ between 980 g/mol and 3,400 g/mol.

The poly(borazylenes) can be pyrolyzed to BN in high ceramic (generally at least 85–93%) and chemical (89–98%) yields by methods known in the art. Generally, the precursors are slowly heated (5–10° C. per minute) to a temperature in the range of about 500° to 1200° C. under either argon or ammonia. Thermogravimetric analysis of the ceramic conversion shows that the polymer follows a well defined decomposition path in which an initial (2%) weight loss (probably resulting from polymer crosslinking) occurs in a narrow range between 125 to 300° C., followed by a gradual 4% loss ending by 1100° C. Thus, poly(borazylene) appears to be an excellent precursor to boron nitride which, because of its solubility, low temperature decomposition and high ceramic and chemical yields, make it an excellent candidate for the generation of, for example, fibers and coatings of boron nitride.

The borazine/borane, carborane or heteroborane oligomers may also be prepared in high yields by heating mixtures of the liquid reactants, neat or in an appropriate nonreactive solvent, in the absence of catalyst. For example, pentaborane (9)/borazine oligomers have been formed by heating the reactants at temperatures between 45–100° C. in vacuo for periods ranging from 2 to 24 hours. These oligomers are useful as precursors for boron enriched ceramics, the ceramics being prepared by pyrolysis under conditions analogous to those discussed above.

Myriad uses exist for the ceramic materials which can be made as described above. They may be used, for example, to prepare refractory bodies, fibers and composites. By virtue of the processability of the ceramic precursors of this invention, the ceramic materials prepared therefrom may be utilized in other applications. For example, thin BN films may be made by casting thin films of the precursor and then pyrolyzing the film. BN fibers may be made by drawing fibers from a solution of the precursor and pyrolyzing. In a similar manner, substrates such as but not limited to fibers and silicon chips may be coated with BN by coating the substrate with the soluble precursor and then subjecting the coated substrate to pyrolysis conditions. The soluble precursor may also be injection molded into any shape desired. Green bodies which will retain their shape are formed by heating to a temperature of about 200 to 400° C. for at least two hours. In each of these applications, the availability of a soluble ceramic precursor allows for preparation of the ceramic article under milder conditions than those required by conventional powder methods which must be used with less processible precursors.

The methods and products of this invention are further illustrated in the following examples which are not intended to limit the scope of the invention.

EXAMPLE 1
Formation of Poly(Borazylene)

Borazine (3.15 g, 39.1 mmol) was condensed into an evacuated flask at −196° C. and warmed to 70° C. After 48 h the solution became viscous and the reaction was stopped. The flask was degassed and the volatiles including all diborazine or borazanaphthalene were removed under vacuum. The solid residue (2.84 g, 90% yield) was dissolved in dry tetrahydrofuran (THF) and recrystallized using dry pentane to precipitate the polymer. The recrystallized polymer was dried under vacuum giving a fine white powder (1.93 g, 61% yield). The polymer was characterized by $^{11}B$ NMR, elemental analysis, uv, diffuse reflectance infrared, and size exclusion chromatography/low angle laser light scattering.

$^{11}B$ NMR (160.5 MHz, THF) 31 ppm (s,vbr). Elemental Analysis: calcd. for $(B_3N_3H_4)_x$: B, 41.32; N, 53.54; H, 5.14 fd: B, 42.33; N, 53.25; C, 1.09; H, 3.49. UV absorbance at $\lambda_{max}$220 nm. IR (diffuse, KBr) 3445 m, 3230 m,br, 2505 m, 1450 s,br, 1200 m, 900 m, 750 m, 690 m; Mw=7600±0.460; Mn=3400 ±210; Mw/Mn=2.23.

Molecular weight studies using size exclusion chromatography/low angle laser light scattering (SEC/LALLS) indicate that the crude material, before recrystallization ($M_w$=4000±540, $M_n$=1400±190, $M_w/M_n$=2.86) and the recrystallized sample ($M_w$=7600±460, $M_n$=3400±210, $M_w/M_n$=2.23) show broad molecular weight distributions. Thus, based on a linear chain model, $D_n$ (number average degree of polymerization) for these materials ranges from 18 to 43 and $D_w$ (weight average degree of polymerization) from 51 to 97. Polymerizations carried out for shorter times, for example 24 hours, showed correspondingly lower molecular weight averages ($M_w$=2100±330, $M_n$=980±150).

Evidence of chain branching was also found in the LALLS chromatograms of both the crude and recrystallized polymers, where early eluting high molecular weight components characteristic of highly branched or partially crosslinked chains were observed. In addition, the SEC/LALLS/UV studies showed that polymers in the high molecular weight end of the molecular weight distribution, including the high molecular weight component detected by the LALLS detector, had greater UV absorbance per unit mass than those in the lower molecular weight region of the molecular weight distribution. This heterogeneity with respect to UV absorbance at the high molecular weight end of the molecular weight distribution is consistent with the greater availability of branching sites.

Although its detailed structure has not been established, the polymer is proposed to be composed primarily of linked borazine rings, analogous to those of the organic poly (phenylene) polymers. Since small amounts of the N:B coupled dimer 1:2'-$(B_3N_3H_5)_2$ are isolated in the volatile materials from the reaction, the polymer is likely to contain N—B linkages between the borazines. Consistent with this interpretation, the $^{11}B$ NMR spectrum has a broad peak centered in the borazine region at 31 ppm. Also isolated in the volatiles were small amounts of borazanaphthalene, thus it is possible that the polymer also contains some degree of fused ring structure.

EXAMPLE 2
Fiber Coatings with Polyborazylene

Fiber bundles were dipped in dilute solutions (0.1–5.0%) of polyborazylene in tetrahydrofuran. Excess solution was removed by agitating the bundle until the coating appeared uniform. The coated bundles were placed in a ceramic boat lined with platinum foil which was transferred to a tube furnace. The fiber bundles were then pyrolyzed under argon to 1000° C. After pyrolysis the resulting BN coatings were characterized by Scanning Electron Microscopy and Auger Electron Spectroscopy.

EXAMPLE 3
Polyborazylene Fibers

A 30% w/w solution of polyborazylene in tetrahydrofuran (THF) was made viscous by vacuum evaporating solvent until the solution was unable to be stirred by a magnetic stirring bar. A drop of the solution was then placed between two spatulas and pulled apart to form a fiber. Once the solvent evaporated the fiber was placed in a ceramic boat lined with platinum foil and transferred to a tube furnace where it was pyrolyzed under argon to 1000° C. Analysis of the resulting fiber by scanning electron microscopy and Auger spectroscopy revealed the formation of a 50 μm boron nitride fiber.

EXAMPLE 4
Formation of Poly(B-Ethyl Borazine)

B-Ethylborazine (1.25 g, 11.5 mmol) was condensed into an evacuated flask at −196° C. The reaction flask was heated at 110° C. for eight days. The flask was degassed and volatile components removed under vacuum. The solid residue was dissolved in dry tetrahydrofuran (THF), filtered (through a fine frit), and recrystallized using dry pentane to precipitate the polymer from solution. The polymer was then dried under vacuum giving a fine white powder 0.304 g, 24%. The polymer was characterized by $^{11}B$ NMR, diffuse reflectance infrared spectroscopy, and elemental analysis. $^{11}B$ NMR (115.5 MHz, THF) 36 ppm (s,vbr). BR (diffuse KBr) 3445 m, 2952 m, 2873 m, 2508 m,br, 1489 s,br, 896 m, 766 m, 693 m. Elemental Analysis: calcd for $(B_3N_3H_3C_2H_5)_x$: B, 30.44; N, 39.47; H, 7.56; C, 22.53; fd: B, 32.37; N, 43.45; H, 6.05; C, 16.81.

EXAMPLE 5
B-Ethylborazine Preparation

In a typical reaction, 10 mg ($1.09 \times 10^{-2}$ mmol) of RhH(CO)(PPh$_3$)$_3$ were placed in a Fisher-Porter pressure vessel which was then evacuated. Borazine (2.77 g, 34.4 mmol) and ethylene (9.0 mmol) were condensed into the flask at −196° C., and the mixture was warmed to room temperature. A two to three fold excess of borazine was used to minimize the formation of di-and triethylborazine. The reaction was allowed to stir for 12 h and then vacuum fractionated through a 0, −20, −45, and −196° C. trap series. The −20 and −45° C. fractions were refractionated to separate B-ethylborazine from unreacted borazine with pure B-ethylborazine remaining in the −20° C. trap. The compound was characterized by $^{11}B$ and $^1H$ NMR and IR. $^{11}B$ NMR (160.5 MHz, C$_6$D$_6$) 31.5 ppm (d, $J_{BH}$=135 Hz, B4B6), 36.7(s, B2), $^1H$ NMR (500 MHz C$_6$D$_6$) 0.64(q, $J_{CH_3CH_2}$=8 Hz, CH$_3$), 0.80(t, $J_{CH_2CH_3}$=7.8 Hz, (CH$_2$, 2), 4.57(q, br, $J_{BH}$=131 Hz, BH, 2), 4.82(t, $J_{NH}$=50 Hz, NH, 2), 4.99 (t, $J_{NH}$=40 Hz, NH, 1). IR (Gas cell, NaCl windows, 10 cm) 3478 m, 2970 m, 2920 n, 2895 m, 2590 w, 2510 s, 2420 w, 1475 vs,br, 1440 vs, 1390 s, 1355 w, 1110 w, 930 m, 915 s, 770 w, 720 m.

EXAMPLE 6
Borazine/Pentaborane (9) Preparation

In a typical reaction 1.78 g (28 mmol) of pentaborane(9) and 1.21 g (15 mmol) of borazine were condensed at −196° C. into an evacuated, 50 mL one neck flask equipped with a magnetic stirring bar. The flask was warmed at 65° C. and the solution stirred for 24 h. At the end of this period the flask was degassed and the volatile contents (100–200 mg) vacuum fractionated through a −45° and −196° C. trap series. Stopping in the −45° C. trap were borazanaphthalene, diborazine, borazine-pentaborane coupled products, and pentaborane dimers. Remaining in the reaction flask was 50–100 mg of an opaque greenish-yellow material composed of pentaborane/borazine oligomers.

Analysis of the volatile materials by GC/mass spectroscopy showed: (Retention time, m/e) borazanaphthalane 5.18 min, 133 m/e; pentaborane dimers (B$_5$H$_8$)$_2$, isomer I, 6.14 min, 124 m/e; isomer II, 6.3 min., 124 m/e; borazine-pentaborane B$_3$N$_3$H$_5$—B$_5$H$_8$, isomer I, 6.52 min., 123 m/e; isomer II, 6.82 min., 143 m/e and diborazine 7.08 min, 160 m/e. The identity of each of these products was then confirmed by comparison of their NMR data with those reported previously.

What is claimed is:

1. A method of preparing poly(borazylene) consisting essentially of repeating units of the formula (B$_3$N$_3$H$_4$) which method consists essentially of heating borazine, in the liquid phase or in solution, and in the absence of metal catalyst, at an effective polymerizing temperature.

2. The method of claim 1 wherein said effective polymerizing temperature is at least about 65° C.

3. The method of claim 1 wherein said heating is carried out in vacuo or under an inert solvent.

4. The method of claim 2 wherein said heating is carried out in vacuo or under an inert solvent.

5. A method of preparing a boron nitride precursor consisting essentially of heating borazine, in the liquid phase or in solution, and in the absence of metal catalyst, at an effective polymerizing temperature.

6. The method of claim 5 wherein said effective polymerizing temperature is at least about 65° C.

7. The method of claim 5 wherein said heating is carried out in vacuo or under an inert solvent.

8. The method of claim 6 wherein said heating is carried out in vacuo or under an inert solvent.

9. A method of preparing a substrate coated with boron nitride comprising (a) preparing a boron nitride precursor by heating borazine, in the liquid phase or in solution, and in the absence of metal catalyst, at an effective polymerizing temperature, (b) coating said substrate with said boron nitride precursor, and (c) subjecting the coated substrate to pyrolyzing conditions.

10. A method of preparing a boron nitride film comprising (a) preparing a boron nitride precursor by heating borazine, in the liquid phase or in solution, and in the absence of metal catalyst, at an effective polymerizing temperature, (b) casting a film of said boron nitride precursor, and (c) subjecting said film to pyrolyzing conditions.

11. A method of preparing a boron nitride fiber comprising (a) preparing a boron nitride precursor by heating borazine, in the liquid phase or in solution, and in the absence of metal catalyst, at an effective polymerizing temperature, (b) drawing a fiber of said boron nitrode precursor, and (c) subjecting said fiber to pyrolyzing conditions.

* * * * *